(12) United States Patent
Son et al.

(10) Patent No.: US 8,924,923 B2
(45) Date of Patent: Dec. 30, 2014

(54) APPARATUS AND METHOD OF GENERATING MULTI-LEVEL TEST CASE FROM UNIFIED MODELING LANGUAGE SEQUENCE DIAGRAM BASED ON MULTIPLE CONDITION CONTROL FLOW GRAPH

(71) Applicants: Hongik University Industry-Academic Cooperation Foundation, Seoul (KR); Daegu National University of Education Industry-Academic Cooperation Foundation, Daegu (KR)

(72) Inventors: Hyun-seung Son, Chungcheongnam-do (KR); Woo-yeol Kim, Gyeonggi-do (KR); Robertyoungchul Kim, Seoul (KR)

(73) Assignees: Sejong Industry-Academia Cooperation Foundation Hongik University, Sejong (KR); Daegu National University of Education Industry-Academic Cooperation Foundation, Daegu (KR)

( * ) Notice: Subject to any disclaimer, the term of this patent is extended or adjusted under 35 U.S.C. 154(b) by 50 days.

(21) Appl. No.: 13/759,179

(22) Filed: Feb. 5, 2013

(65) Prior Publication Data

US 2014/0130006 A1 May 8, 2014

(30) Foreign Application Priority Data

Nov. 6, 2012 (KR) .................. 10-2012-0124859

(51) Int. Cl.
*G06F 9/44* (2006.01)
*G06F 11/36* (2006.01)

(52) U.S. Cl.
CPC ................. *G06F 11/3684* (2013.01)

USPC .......................................... 717/104; 717/105

(58) Field of Classification Search
None
See application file for complete search history.

(56) References Cited

U.S. PATENT DOCUMENTS

| | | | |
|---|---|---|---|
| 6,704,750 B2 * | 3/2004 | Asazu .................................. | 1/1 |
| 7,134,113 B2 * | 11/2006 | Williams ...................... | 717/106 |
| 7,664,989 B2 * | 2/2010 | Joshi et al. ................. | 714/38.14 |
| 8,234,303 B2 * | 7/2012 | Bahl et al. ..................... | 707/786 |
| 8,443,336 B2 * | 5/2013 | Vieira et al. .................. | 717/104 |

(Continued)

OTHER PUBLICATIONS

Emery et al., "Multi-Level Software Testing Based on Cyclomatic Complexity". IEEE, CH2759-9/89/0000-050$10 .OO 0 1989 IEEE, 1989.*

(Continued)

*Primary Examiner* — Don Wong
*Assistant Examiner* — Hossain Morshed
(74) *Attorney, Agent, or Firm* — Davis & Bujold, PLLC; Michael J. Bujold (57) ABSTRACT

Disclosed herein are an apparatus and a method for generating a multi-level test case for testing software from a unified modeling language (UML) sequence diagram (SD) based on a multiple condition control flow graph (MCCFG). The apparatus includes: a UML SD metamodel storing unit storing a UML SD metamodel defined for a model to be converted therein; an MCCFG metamodel storing unit storing an MCCFG metamodel; a model converting unit model-converting the UML SD from which the test case is to be generated according to the UML SD metamodel and the MCCFG metamodel to generate the MCCFG; and a coverage criteria unit converting the MCCFG into a tree structure and then converting the tree structure into test cases according to a selection command.

20 Claims, 6 Drawing Sheets

(56) References Cited

U.S. PATENT DOCUMENTS

| | | | |
|---|---|---|---|
| 8,719,795 B2* | 5/2014 | Bokhari | 717/127 |
| 8,752,003 B2* | 6/2014 | Salehi et al. | 717/104 |
| 2004/0148590 A1* | 7/2004 | Lapitski et al. | 717/124 |
| 2007/0283327 A1* | 12/2007 | Mathew et al. | 717/124 |
| 2007/0288885 A1* | 12/2007 | Brunel et al. | 717/104 |
| 2009/0172647 A1* | 7/2009 | Telang | 717/135 |
| 2009/0178102 A1* | 7/2009 | Alghathbar et al. | 726/1 |
| 2010/0138808 A1* | 6/2010 | Kim et al. | 717/104 |
| 2010/0153150 A1* | 6/2010 | Prigge et al. | 705/7 |
| 2010/0175054 A1* | 7/2010 | Matusikova et al. | 717/136 |
| 2010/0198612 A1* | 8/2010 | Streepy, Jr. | 705/2 |
| 2010/0251156 A1* | 9/2010 | Cantwell | 715/771 |
| 2010/0251208 A1* | 9/2010 | Murthy | 717/104 |
| 2011/0231828 A1* | 9/2011 | Kaulgud et al. | 717/131 |
| 2012/0066550 A1* | 3/2012 | Keum et al. | 714/38.1 |
| 2012/0254830 A1* | 10/2012 | Conrad et al. | 717/106 |
| 2012/0260230 A1* | 10/2012 | Choudhary et al. | 717/105 |
| 2013/0116986 A1* | 5/2013 | Zhang et al. | 703/2 |

OTHER PUBLICATIONS

Emery et al., "Multi-level software testing based on cyclomatic complexity", IEEE 1989.*

* cited by examiner

```
create OUT : MCCFGM from IN : SDM;
rule LifelineToGroup {
    from f : SDM!"Lifeline"
    to   t : MCCFGM!"Group" (name <- f.name)
}
rule SendOperationEventToNode {
    from f : SDM!"SendOperationEvent"
    to t : MCCFGM!"Node" ( name <- f.name, id <- f.id )
}
rule ReceiveOperationEventToNode {
    from f : SDM!"ReceiveOperationEvent"
    to t : MCCFGM!"Node" ( name <- f.name )
}
rule MeessageToEdge {
    from f : SDM!"Message"
    to t : MCCFGM!"Edge" (
            name <- f.name, source <- thisModule.findNode(f.sendEvent),
            target <- thisModule.findNode(f.receiveEvent) )
}
rule CombinedFragmentToNode1 {
    from f : SDM!"CombinedFragment"( f.interactionOperator = 'alt' or
            f.interactionOperator = 'opt' or f.interactionOperator = 'loop')
    do { thisModule.CreateNode( f.operand.guard.pecification.value ); }
}
rule CombinedFragmentToNode2 {
    from f : SDM!"CombinedFragment"( f.interactionOperator = 'par' )
    to t : MCCFGM!"ForkNode" (
            name <- f.name, incoming <- Sequence{ thisModule.findSendEvent( f.covered ) },
            outgoing <- Sequence{ thisModule.findReceiveEvent( f.covered ) } )
}
```

Fig. 4

UML SD    MCCFG

UML SD    MCCFG

Fig. 8

UML SD    MCCFG

Fig. 9

UML SD    MCCFG

APPARATUS AND METHOD OF GENERATING MULTI-LEVEL TEST CASE FROM UNIFIED MODELING LANGUAGE SEQUENCE DIAGRAM BASED ON MULTIPLE CONDITION CONTROL FLOW GRAPH

CROSS REFERENCE TO RELATED APPLICATION

This application claims the benefit of Korean Patent Application No. 10-2012-0124859, filed on Nov. 6, 2012, entitled "Apparatus and Method of Generating Multi-Level Test Case from Unified Modeling Language Sequence Diagram Based on Multiple Condition Control Flow Graph", which is hereby incorporated by reference in its entirety into this application.

BACKGROUND

1. Field

The present invention relates to an apparatus and a method of generating a multi-level test case from a unified modeling language (UML) sequence diagram (SD) based on a multiple condition control flow graph (MCCFG), capable of generating the multi-level test case for testing multi-software from the UML SD based on the MCCFG.

2. Description of the Related Art

It is absolutely necessary to test software in order to minimize a problem of the software. As quality of the software has become important, various and improved test methods have been required in a software field.

The reason is that as embedded systems and software systems, which are subjects performing a test of the software, have been changed from a single system into a heterogeneous complex system, a scale of the software has been gradually enlarged.

In addition, testing of the software should be changed from testing for an existing single system into testing for a heterogeneous complex system.

Therefore, many efforts to improve quality of the software have been gradually required.

The testing of the software is a very important step in improving the quality of the software. About 30 to 60% of a development cost is required for testing the software.

The testing of the software is an attempt to judge a defect of the software. In existing testing of the software, which is a final step in a process of developing the software, a traditional method of a software development fife cycle is applied.

However, in the case in which the testing of the software is applied in the final step, an additional cost may be incurred for developing the software, and a significant cost is also incurred for correcting a defect.

Therefore, in order to minimize an additional cost that may be incurred in developing steps of the software and increase reusability and extensibility for results calculated in each developing step, it is required to analyze requirements in each developing step, perform a design according to divided requirements in a design step, and extract a test case.

In this sense, an operation of generating a test case based on requirements is a very important operation in a test operation, determining quality of the software.

However, research into a method of generating the test case based on the requirements has not been sufficiently conducted. In addition, due to reasons such as an infinite input value, a path, a timing, and the like, it is impossible to perfectly perform the testing. That is, it is impossible to test all possibilities of the software except for extremely simple software.

Therefore, instead of perfectly performing the testing of the software, an effort to perform testing according to a priority has been focused.

The perfect testing has been considered in the case of developing software of a safety critical system, for example, space air, medical treatment, and the like, and is actually strong testing rather than the perfect testing.

Most of the generally software is not an object of the perfect testing. Therefore, an attempt to perfectly test the general software may be considered as an unnecessary waste of a time and a resource.

Therefore, according to the related art, a method of generating a test case by mixing several test methods with each other has been used.

However, the method of generating a test case by mixing several test methods with each other is complicated to make automation difficult, such that a cost required for testing the software is increased.

SUMMARY

An object of the present invention is to provide an apparatus and a method of generating a multi-level test case from a unified modeling language (UML) sequence diagram (SD) based on a multiple condition control flow graph (MCCFG), capable of generating test cases based on requirements in order to automatically generate different levels of test cases according to various coverages.

Another object of the present invention is to provide an apparatus and a method of generating a multi-level test case from a UML SD based on an MCCFG, capable of generating test cases by model-converting the UML SD into the MCCFG and applying a coverage to the model-converted MCCFG.

Still another object of the present invention is to provide an apparatus and a method of generating a multi-level test case from a UML SD based on an MCCFG, capable of generating different strengths of test cases according to priorities of tests.

Objects of the present invention are not limited to the above-mentioned objects. That is, other objects that are not mentioned may be obviously understood by those skilled in the art to which the present invention pertains from the following description.

With an apparatus and a method of generating a multi-level test case from a UML SD based on an MCCFG according to an exemplary embodiment of the present invention, a test case is generated based on requirements.

The UML SD is used in order to represent the requirements and a control flow graph (CFG) is used in order to apply a multi-level test case, wherein the CFG is used as an intermediate model between the UML SD and the test case.

However, the multi-level test case may not be generated using the CFG. The reason is that the CFG does not represent information on multiple conditions. Therefore, there is a need to extend the CFG so as to represent the conditions.

Therefore, in the present invention, a multiple condition CFG (MCCFG) in which a concept of the multiple conditions is additionally extended from the CFG is defined.

The MCCFG in which the concept of the multiple conditions is extended from the CFG may process conditions of 'AND' and 'OR' and represent several conditions by combining 'AND' and 'OR' with each other.

In order to automatically convert between two models, metamodels for each model are defined using a meta object facility (MOF), and conversion between the two models is performed.

Coverage criteria are applied using the MCCFG, thereby making it possible to automatically generate final test cases for each coverage.

Here, in order to effectively perform generation of the test case, the test case is generated after the MCCFG is converted into a tree structure.

According to an exemplary embodiment of the present invention, there is provided an apparatus of generating a multi-level test case from a unified modeling language (UML) sequence diagram (SD) based on a multiple condition control flow graph (MCCFG), the apparatus including: a UML SD metamodel storing unit storing a UML SD metamodel therein; an MCCFG metamodel storing unit storing an MCCFG metamodel; a model converting unit model-converting the UML SD according to the UML SD metamodel and the MCCFG metamodel to generate the MCCFG; and a coverage criteria unit converting the MCCFG into a plurality of test cases.

The UML SD metamodel storing unit may store a UML SD metamodel extracted from a UML specification therein The UML SD metamodel may include at least one of Interaction, Lifeline, InteractionFragment, and Message.

The InteractionFragment may include CombinedFragment of which a kind includes seq, alt, opt, break, par, and loop.

The MCCFG metamodel may include at least one of ORDecisionNode representing an OR condition and ANDDecisionNode representing an AND condition in MultiConditionGroup.

The model converting unit may map the UML SD metamodel and the MCCFG metamodel to each other according to a mapping rule of an Atlas transformation language (ATL) to perform the model-conversion to the MCCFG.

The coverage criteria unit may change the MCCFG into a tree structure and convert the tree structure into the plurality of test cases.

The plurality of test cases may be at least one of statement coverage (SC), decision coverage (DC), condition/decision coverage (CDC), and modified condition/decision coverage (MC/DC) test cases.

The coverage criteria unit may generate each of the plurality of test cases so as to be divided into at least one of Test scenario ID, Testcase ID, Inflow, Event, Condition, and Outflow.

According to another exemplary embodiment of the present invention, there is provided a method of generating a multi-level test case in an apparatus of generating a multi-level test case from a UML SD based on an MCCFG, the method including: model-converting, by a model converting unit, the UML SD according to a UML SD metamodel and an MCCFG metamodel to generate the MCCFG; and converting, by a coverage criteria unit, the MCCFG into a plurality of test cases.

The UML SD metamodel may be a UML SD metamodel extracted from a UML specification.

The UML SD metamodel may include at least one of Interaction, Lifeline, InteractionFragment, and Message.

The InteractionFragment may include CombinedFragment of which a kind includes seq, alt, opt, break, par, and loop.

The MCCFG metamodel may include at least one of ORDecisionNode representing an OR condition and ANDDecisionNode representing an AND condition in MultiConditionGroup.

In the model-converting, the UML SD metamodel and the MCCFG metamodel may be mapped to each other according to a mapping rule of an Atlas transformation language (ATL) to perform the model-conversion to the MCCFG.

In the converting, the MCCFG may be changed into a tree structure and the tree structure may be converted into the plurality of test cases according to a selection command by a user.

The plurality of test cases may be at least one of statement coverage (SC), decision coverage (DC), condition/decision coverage (CDC), and modified condition/decision coverage (MC/DC) test cases.

In the converting, each of the plurality of test cases may be generated so as to be divided into at least one of Test scenario ID, Testcase ID, Inflow, Event, Condition, and Outflow.

BRIEF DESCRIPTION OF THE DRAWINGS

Hereinafter, the present invention will be described in detailed through exemplary embodiments thereof with reference to the accompanying drawings, in some of which the same reference numeral will be used to describe the same component.

DETAILED DESCRIPTION

The following detailed description is only an example and only illustrates exemplary embodiments of the present invention. In addition, a principle and a concept of the present invention are provided in order to most usefully and easily describe the present invention.

Therefore, for basic understanding of the present invention, a more detailed structure than necessary will not be provided, and several forms of the present invention that may be executed by those skilled in the art will be illustrated in the accompanying drawings.

Figure 1:
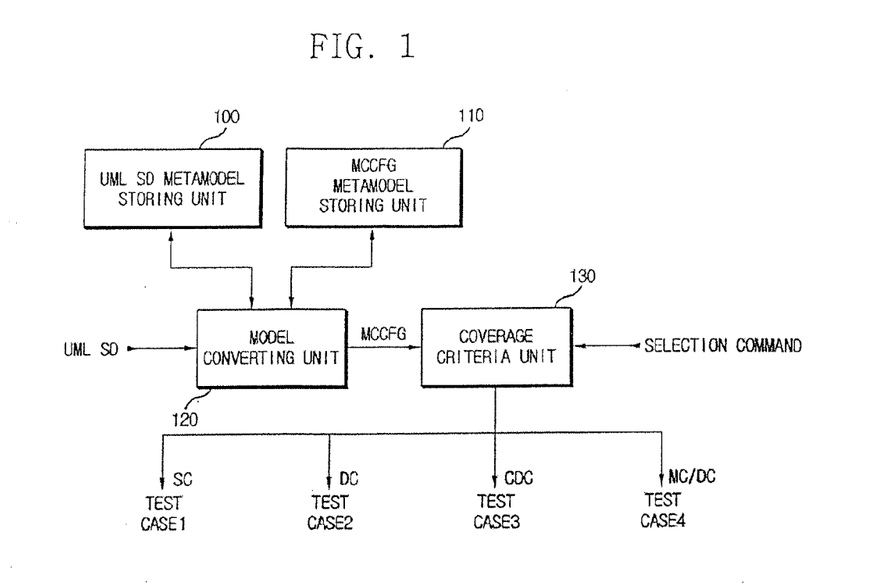
FIG. 1 is a block diagram showing a configuration of an apparatus of generating a test case according to an exemplary embodiment of the present invention.

FIG. 1 is a block diagram showing a configuration of an apparatus of generating a test case according to an exemplary embodiment of the present invention. Here, reference numeral 100 indicates a unified modeling language (UML) sequence diagram (SD) metamodel storing unit in which a UML SD metamodel defined for a model to be converted is stored.

In order to define the UML SD metamodel, in the present invention, the UML SD metamodel is extracted from a specification of UML, the extracted UML SD metamodel is stored in the UML SD metamodel storing unit 100.

Main elements of the UML SD metamodel stored in the UML SD metamodel storing unit 100 may include Interaction, Lifeline, InteractionFragment, and Message.

The Interaction, which is an instance of a class, may be configured of Lifeline, InteractionFragment, and Gates. The Lifeline, which is a lifeline of an object, may be continued from creation of the object to destruction thereof. The InteractionFragment may have several kinds of Fragments, mainly, CombinedFragment of which a kind may include seq, alt, opt, break, par, loop, and the like.

The Message is generated by connecting the Gates to each other.

Reference numeral 110 indicates a multiple condition control flow graph (MCCFG) metamodel storing unit in which an MCCFG metamodel is stored. In the MCCFG metamodel stored in the MCCFG metamodel storing unit 110, which is based on a metamodel of a UML activity diagram, a structure of an activity diagram metamodel defined in a UML 2.4 specification has been changed into a structure easy to use, and elements of multiple condition portions have been newly added.

In addition, the MCCFG metamodel is allowed to use Group and is mainly configured of AbstractNode and Edge. The AbstractNode, which is an abstract node for all nodes, may include InitialNode, FinalNode, Node, and the like. The Edge serves as a bridge connecting nodes to each other.

The MCCFG metamodel according to the exemplary embodiment of the present invention as described above may include ORDecisionNode and ANDDecisionNode in MultiConditionGroup. The ORDecisionNode represents an OR condition, and the ANDDecisionNode represents an AND condition.

Figure 2:
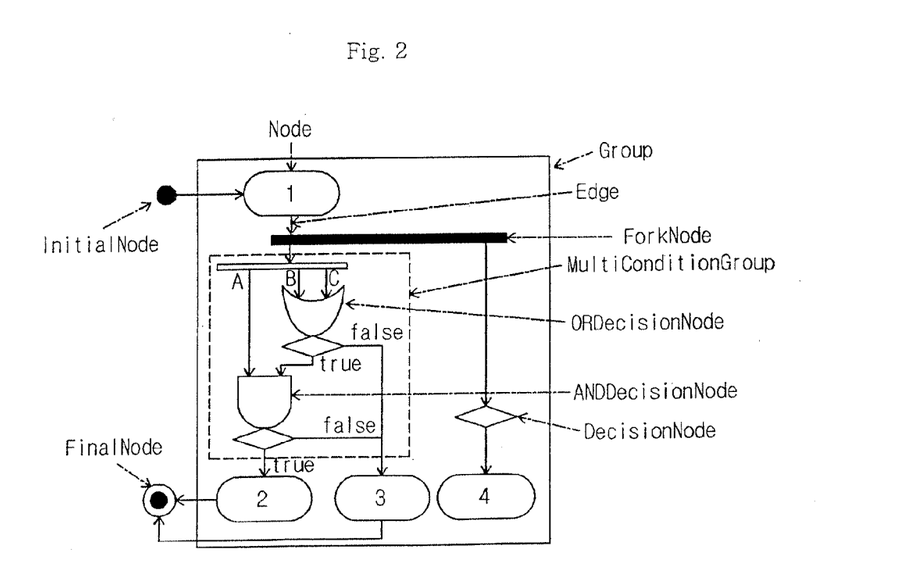
FIG. 2 is a diagram showing elements for a multiple condition control flow graph (MCCFG) metamodel in the apparatus of generating a test case according to the exemplary embodiment of the present invention.

FIG. 2 is a diagram showing elements for an MCCFG metamodel. In FIG. 2, a condition of used MultiConditionGroup represents the case in which 'A==true && (B==true||C==true)'.

In the condition of the MultiConditionGroup, which is represented according to a priority, since a priority of the OR condition is higher than that of the AND condition, after the OR condition is first represented, the AND condition is represented.

In addition, each of the ORDecisionNode and the ANDDecisionNode allows only two inputs. In the case in which connection is made using several ANDs, the ANDs may be listed and represented as if ORs are coupled to each other.

Since decision nodes in a control flow graph (CFG) are represented as one regardless of the number of conditions, also in the case of generating the decision nodes as a test case, the decision nodes are processed as one condition.

Therefore, according to the related art, in the case of applying a modify condition/decision coverage in the CFG, conditions have been separately extracted to generate a test case.

However, since an MCCFG in the present invention represents all of the conditions in the model, in the case of generating a test case satisfying the MCCFG, it is possible to generate a test case without a separate operation.

Reference numeral indicates a model converting unit. The model converting unit 120 extracts elements that become control flows in the UML SD from which the test case is to be generated and model-converts the elements that become the control flows according to the UML SD metamodel stored in the UML SD metamodel storing unit 100 and the MCCFG metamodel stored in the MCCFG metamodel storing unit 110 to generate the MCCFG.

The model converting unit 120 should perform mapping between the UML SD metamodel stored in the UML SD metamodel storing unit 100 and the MCCFG metamodel stored in the MCCFG metamodel storing unit 110 in order to perform model conversion.

In the present invention, in order to perform the model conversion, a mapping rule is represented using an Atlas transformation language (ATL).

The UML SD metamodel and the MCCFG metamodel have, for example, six mapping rules as shown in the following Table 1.

TABLE 1

| UML SD Metamodel Feature | MCCFG Metamodel Feature |
| --- | --- |
| 1. Lifeline | Group |
| 2. Message | Edge |
| 3. SendOperationEvent and ReceivedOperationEvent | Node(source, target) |
| 4. alt/opt CombinedFragment | DecisionNode or ANDDecisionNode or ORDecisionNode |
| 5. par CombinedFragment | ForkNode or JointNode |
| 6. loop CombinedFragment | DecisionNode or ANDDecisionNode or ORDecisionNode |

Figure 3:
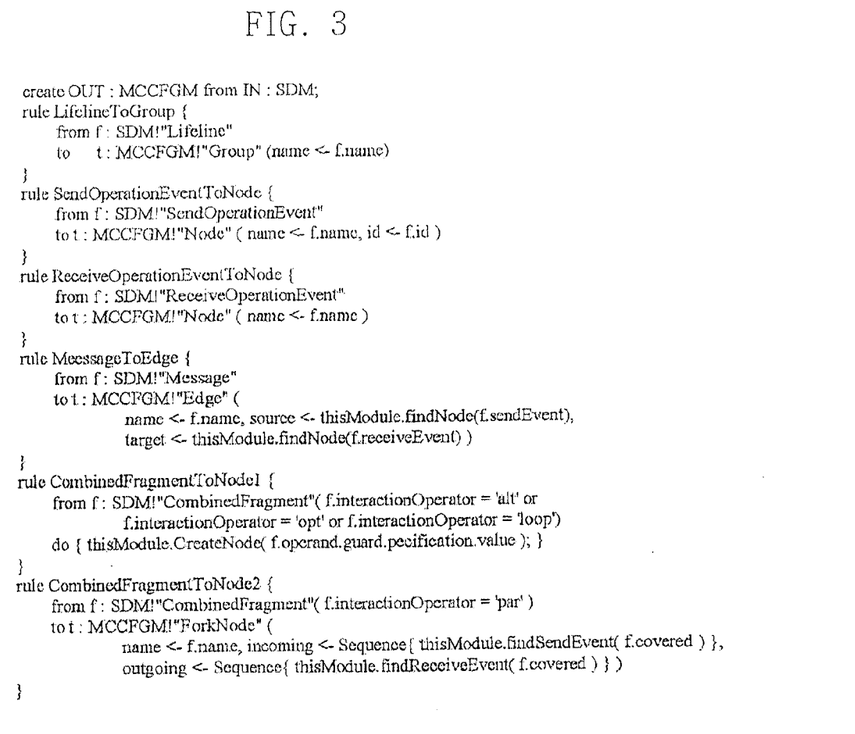
FIG. 3 is a diagram representing a mapping rule using an Atlas transformation language (ALT) in the apparatus of generating a test case according to the exemplary embodiment of the present invention.

When the mapping rules are represented using the ATL, they may be represented as shown in FIG. 3.

In the ATL, which provides a helper function such as a method of a program language, findNode for finding a node, CreateNode for analyzing an expression to create AND and OR nodes, findSendEvent for finding an event node, and findReceiveEvent has been made using the helper.

When the ATL rule is put into a tool and then performed, a data file of a target model is generated. When the data file is read by the tool, it is output as a graph.

Here, a result appearing in the case of performing a model conversion rule will be described.

In order to extract a graph of a control flow from the UML SD, it is required to label a place at which messages are exchanged between objects. In addition, points at which the next branches occur are connected to each other to make the control flow.

Figure 4:
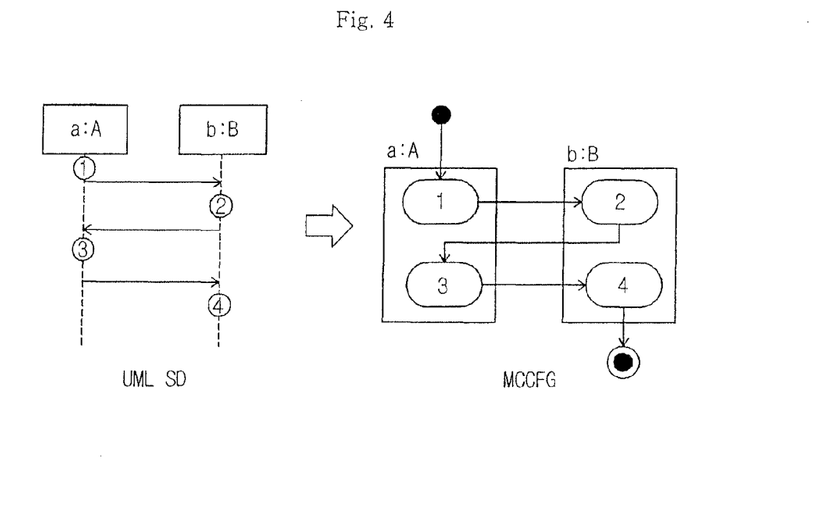
FIG. 4 is a diagram showing conversion from a UML SD having a general form into an MCCFG.

FIG. 4 is a diagram showing conversion from a UML SD having a general form into an MCCFG. In FIG. 4, objects of portions at which messages are exchanged are labeled and are sequentially connected to each other.

In general, in UML 2.4, an SD supports a fragment. The fragment, which is a notation having a special function, is divided into a total of twelve functions, that is, alt, opt, break, par, loop, critical, neg, assert, strict, seq, ignore, and consider.

Figure 5:
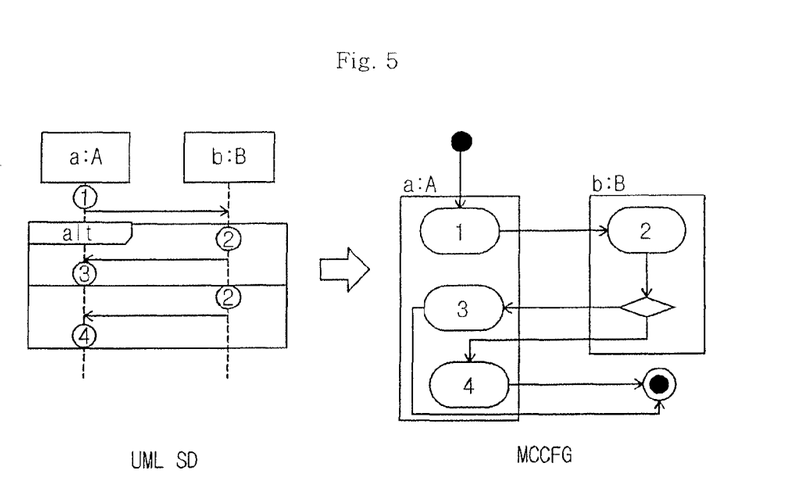
FIG. 5 is a diagram showing conversion from an alternative fragment SD into an MCCFG in the apparatus of generating a test case according to the exemplary embodiment of the present invention.

In the present invention, four functions, that is, alt, opt, par, and, loop, related to the control flow among the above-mentioned twelve functions have been applied FIG. 5 is a diagram showing conversion from an alternative fragment SD into an MCCFG in the apparatus of generating a test case according to the exemplary embodiment of the present invention. Alt is used when another message is called according to the condition. In this case, labeling for a point that becomes a branch is one and division is made based on the branch. When the branching into two syntaxes is made at the alt, the condition is used. The MCCFG represents all conditions as a graph.

FIGS. 6A to 6F are diagrams showing kinds of conditions of MCCFGs in the apparatus of generating a test case according to the exemplary embodiment of the present invention. Referring to FIGS. 6A to 6F, in the present invention, in order to process all conditions as a single condition, the number of input values in the conditions is limited to two.

Figure 6A:
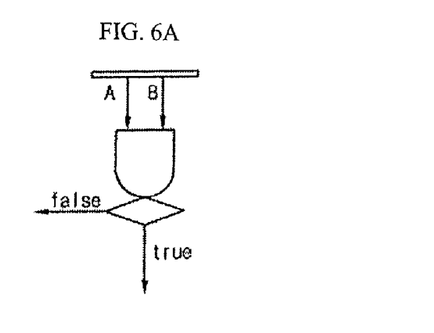
FIGS. 6A to 6F are diagrams showing kinds of conditions of MCCFGs in the apparatus of generating a test case according to the exemplary embodiment of the present invention.
Figure 6B:
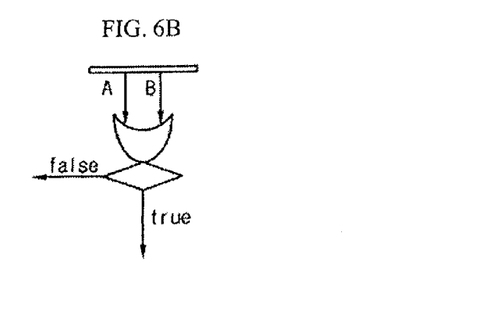
Figure 6C:
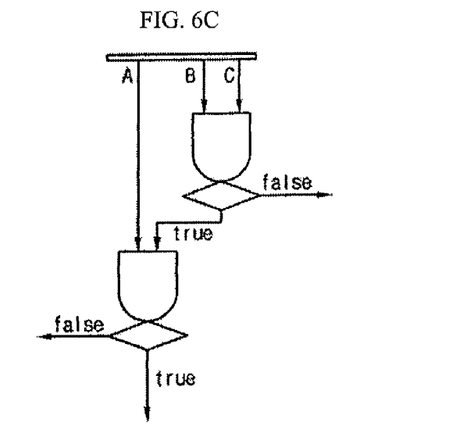
Figure 6D:
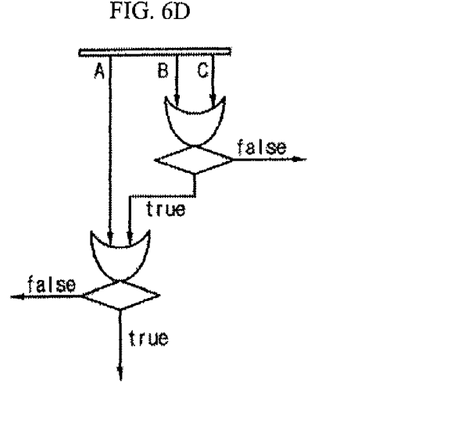
Figure 6E:
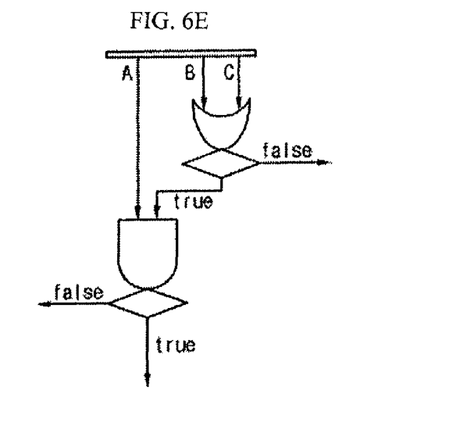
Figure 6F:
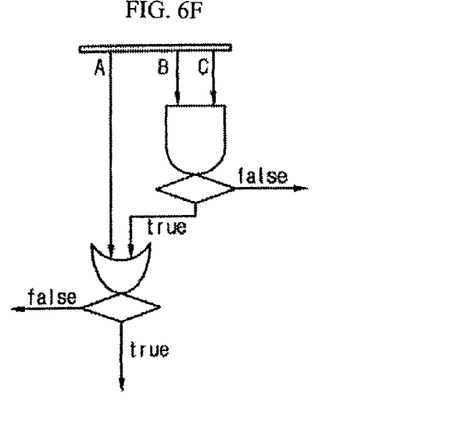

FIGS. 6A and 6B show a single condition of 'A and B' and 'A or B', respectively, FIG. 6C shows a condition of 'A and (B and C)', which is a multi-condition, FIG. 6D shows a condition of 'A or (B or C)', FIG. 6E shows a condition of 'A and (B or C)', and FIG. 6F shows a condition of 'A or (B and C)'.

As described above, the MCCFG according to the exemplary embodiment of the present invention represents the conditions as well as the branch according to a decision value, thereby making it possible to provide information capable of generating the test case.

Figure 7:
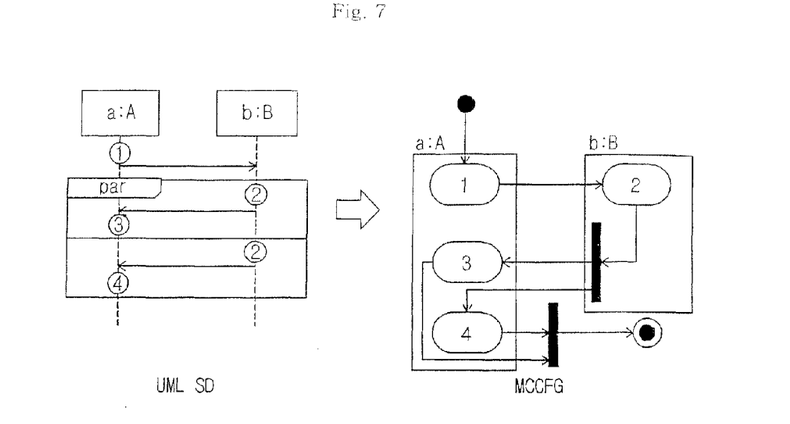
FIG. 7 is a diagram showing conversion from a parallel fragment SD into an MCCFG in the apparatus of generating a test case according to the exemplary embodiment of the present invention.

FIG. 7 is a diagram showing conversion from a parallel fragment SD into an MCCFG in the apparatus of generating a test case according to the exemplary embodiment of the present invention. The par, which is the parallel fragment, is used when messages are simultaneously performed. Since it corresponds to separately performing two messages, one is branched into two. In this case, a parallel state is represented using ForkNode and JoinNode.

Figure 8:
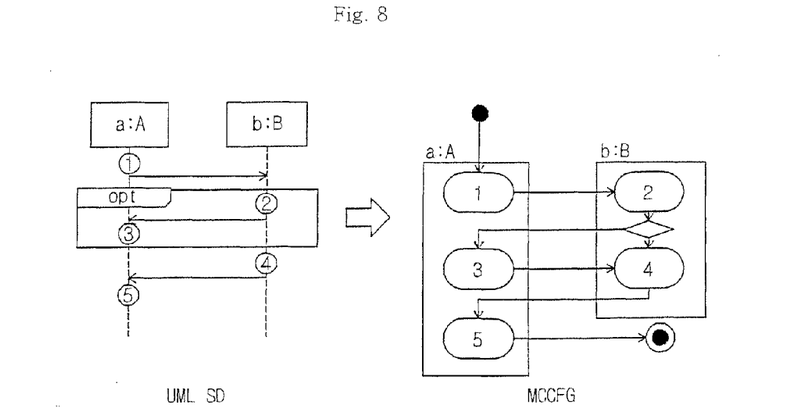
FIG. 8 is a diagram showing conversion from an option fragment SD into an MCCFG in the apparatus of generating a test case according to the exemplary embodiment of the present invention.

FIG. 8 is a diagram showing conversion from an option fragment SD into an MCCFG in the apparatus of generating a test case according to the exemplary embodiment of the present invention. The opt, which is the option fragment, may optionally call the message. Therefore, labels should be present at a start point and an end portion of the message.

The reason is that in the case in which the message calling is not synchronous, the message is not unconditionally taken over to an object to be called, but may be again provided to an object to call. Since a section represented by the opt is optionally executed, a graph is represented so as to move to the next message or pass through the opt section.

Figure 9:
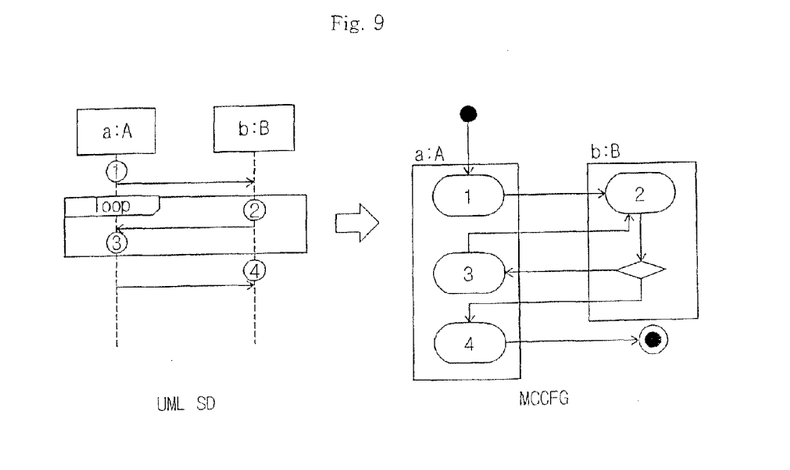
FIG. 9 is a diagram showing conversion from a loop fragment SD into an MCCFG in the apparatus of generating a test case according to the exemplary embodiment of the present invention.

FIG. 9 is a diagram showing conversion from a loop fragment SD into an MCCFG in the apparatus of generating a test case according to the exemplary embodiment of the present invention. The loop, which is the loop fragment, is used when the message is repeatedly performed. This corresponds to continuously performing a message in a loop section until a predetermined condition is satisfied.

The MCCFG model-converted in the model converting unit 120 is converted into the test case according to a selection command by a user in a coverage criteria unit 130.

Figure 10:
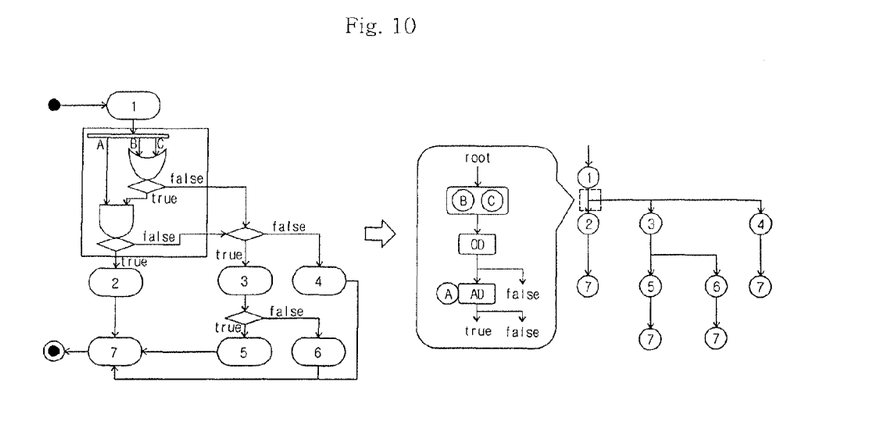
FIG. 10 is a diagram showing conversion from an MCCFG into a tree in order to generate a test case in the apparatus of generating a test case according to the exemplary embodiment of the present invention.

The coverage criteria unit 130 changes the MCCFG into a tree structure as shown in FIG. 10 in order to generate the test cases. In addition, the coverage criteria unit 130 generates the test cases using the tree structure.

The test case generated in the coverage criteria unit 130 is divided into Test scenario ID, Testcase ID, Inflow, Event, Condition, and Outflow as shown in the following Table 2.

TABLE 2

| Test Scenario ID | Testcase ID | Inflow | Event | Condition | Outflow |
|---|---|---|---|---|---|
| TS1 | TC1 | Node1 | F1() | N/A | Node2 |
|  | TC2 | Node2 | F2() | N/A | Node3 |
|  | TC3 | Node3 | F3() | D1 == true | Node4 |
| TS2 | TC4 | Node1 | F4() | D1 == false | Node4 |

The Test Scenario ID is a scenario path generated by connecting the respective test cases to each other. For example, in TS1, TC1, TC2, and TC3 are sequentially performed, and in TS2, TC4 is performed.

In the Testcase ID, an identifier is imparted to a corresponding test case.

The Inflow indicates a start point of a flow, the Event indicates a generated message, the Condition indicates a condition in which the Event is performed, the Outflow indicates an end point of the flow.

A statement coverage (SC), which is a test case 1 generated by the coverage criteria unit 130 according to the selection command by the user, should execute all syntaxes in a program code at least once or more. The SC is a coverage that may be easily accomplished with a small number of test data, but has low insurance, that is, does not verify many portions among possible cases present in the program code.

Since the test case is generated by passing through all nodes of a tree at least once, it may be generated by performing a depth priority search except for a path that has been already performed.

When test cases of the SC are generated using the MCCFG shown in FIG. 10, they may be represented by the following Table 3.

TABLE 3

| Test Scenario ID | Testcase ID | Inflow | Event | Condition | Outflow |
|---|---|---|---|---|---|
| TS1 | TC1 | Node1 | — | N/A | Node2 |
|  | TC2 | Node2 | — | N/A | Node7 |
| TS2 | TC3 | Node3 | — | N/A | Node5 |
|  | TC4 | Node5 | — | N/A | Node7 |
| TS3 | TC5 | Node6 | — | N/A | Node7 |
| TS4 | TC6 | Node4 | — | N/A | Node7 |

A decision coverage (DC), which is a test case 2 generated by the coverage criteria unit 130 according to the selection command is accomplished when all conditional equations in decision points have all values of 'true' and 'false' to flow to all branches. Therefore, all of the portions branched in the tree are generated as the test cases.

When test cases of the DC are generated using the MCCFG shown in FIG. 10, they may be represented by the following Table 4.

TABLE 4

| Test Scenario ID | Testcase ID | Inflow | Event | Condition | Outflow |
|---|---|---|---|---|---|
| TS1 | TC1 | Node1 | — | N/A | Node2 |
|  | TC2 | Node2 | — | N/A | Node7 |
| TS2 | TC3 | Node1 | — | N/A | Node3 |
|  | TC4 | Node3 | — | N/A | Node5 |
|  | TC5 | Node5 | — | N/A | Node7 |
| TS3 | TC6 | Node3 | — | N/A | Node6 |
|  | TC7 | Node6 | — | N/A | Node7 |
| TS4 | TC8 | Node1 | — | N/A | Node4 |
|  | TC9 | Node4 | — | N/A | Node7 |

A condition/decision coverage (CDC), which is a test case 3 generated by the coverage criteria unit 130 according to the selection command, is a coverage that always stratifies both of a condition coverage (CC) and a decision coverage (DC).

The CDC is accomplished when individual conditional equations in decision points have all values of 'true' and 'false'. The DC and CC are distinguished from each other according to whether conditions are considered as a single condition or are separately considered as individual conditions.

When test cases of the CDC are generated using the MCCFG shown in FIG. 10, they may be represented by the following Table 5.

TABLE 5

| Test Scenario ID | Testcase ID | Inflow | Event | Condition | Outflow |
|---|---|---|---|---|---|
| TS1 | TC1 | Node1 | — | A == false, B == true, C == false | Node2 |
| | TC2 | Node1 | — | A == false, B == false, C == true | Node2 |
| | TC3 | Node1 | — | A == true, B == true, C == false | Node2 |
| | TC4 | Node1 | — | A == true, B == false, C == false | Node2 |
| TS2 | TC5 | Node1 | — | A == false, B == true, C == false | Node3 |
| | TC6 | Node1 | — | A == false, B == false, C == true | Node3 |
| | TC7 | Node1 | — | A == true, B == true, C == false | Node3 |
| | TC8 | Node1 | — | A == true, B == false, C == false | Node3 |
| | TC9 | Node3 | — | N/A | Node5 |
| | TC10 | Node5 | — | N/A | Node7 |
| TS3 | TC11 | Node3 | — | N/A | Node6 |
| | TC12 | Node6 | — | N/A | Node7 |
| TS4 | TC13 | Node1 | — | A == false, B == true, C == false | Node4 |
| | TC14 | Node1 | — | A == false, B == false, C == true | Node4 |
| | TC15 | Node1 | — | A == true, B == true, C == false | Node4 |
| | TC16 | Node1 | — | A == true, B == false, C == false | Node4 |
| | TC17 | Node4 | — | N/A | Node7 |

A modified condition/decision coverage (MC/DC), which is a test case 4 generated by the coverage criteria unit 130 according to the selection command, is a coverage that allow the respective individual conditional equations to independently affect results of all condition equations without being affected by other individual conditional equations to improve the CDC.

A method of making the MC/DC is as follows.

All conditional equations in all decision points present in the program have all possible result values (true, false) at least once. Individual conditional equations in the decision points present in the program have all possible result values (true, false) at least once. The respective individual conditional equations at the decision points independently affect result values of the decision points without being affected by other individual conditional equations.

When test cases of the MC/DC are generated using the MCCFG shown in FIG. 10, they may be represented by the following Table 6.

TABLE 6

| Test Scenario ID | Testcase ID | Inflow | Event | Condition | Outflow |
|---|---|---|---|---|---|
| TS1 | TC1 | Node1 | — | A == true, B == true, C == true | Node2 |
| | TC2 | Node1 | — | A == true, B == true, C == false | Node2 |
| | TC3 | Node1 | — | A == true, B == false, C == true | Node2 |
| | TC4 | Node1 | — | A == true, B == false, C == false | Node2 |
| | TC5 | Node1 | — | A == false | Node2 |
| TS2 | TC6 | Node1 | — | A == true, B == true, C == true | Node3 |
| | TC7 | Node1 | — | A == true, B == true, C == false | Node3 |
| | TC8 | Node1 | — | A == true, B == false, C == true | Node3 |
| | TC9 | Node1 | — | A == true, B == false, C == false | Node3 |
| | TC0 | Node1 | — | A == false | Node3 |
| | TC11 | Node3 | — | N/A | Node5 |
| | TC12 | Node5 | — | N/A | Node7 |
| TS3 | TC13 | Node3 | — | N/A | Node6 |
| | TC14 | Node6 | — | N/A | Node7 |
| TS4 | TC15 | Node1 | — | A == true, B == true, C == true | Node4 |
| | TC16 | Node1 | — | A == true, B == true, C == false | Node4 |
| | TC17 | Node1 | — | A == true, B == false, C == true | Node4 |
| | TC18 | Node1 | — | A == true, B == false, C == false | Node4 |
| | TC19 | Node1 | — | A == false | Node4 |
| | TC20 | Node4 | — | N/A | Node7 |

Figure 11:
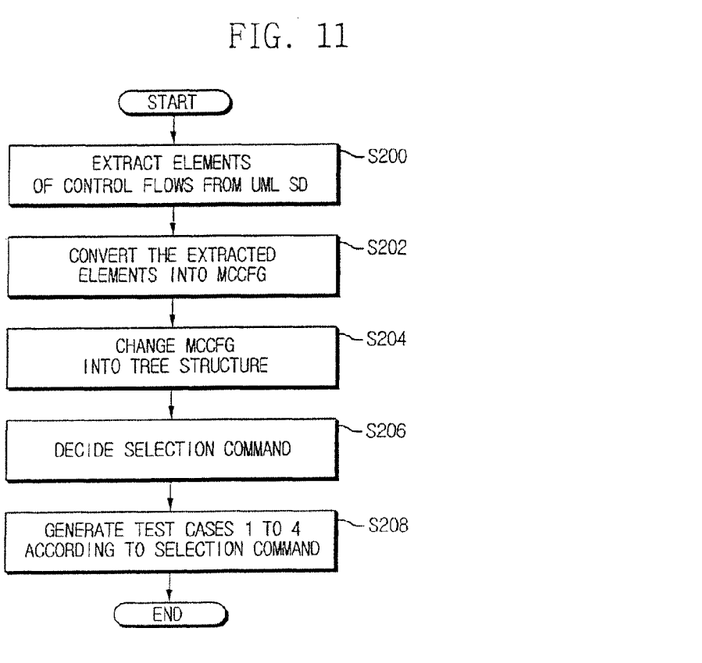
FIG. 11 is a signal flow chart showing a method of generating a test case according to the exemplary embodiment of the present invention.

FIG. 11 is a signal flow chart showing a method of generating a test case according to the exemplary embodiment of the present invention. Referring to FIG. 11, the model converting unit 120 extracts elements that become control flows from an input UML SD (S200) and model-converts the extracted elements that become the control flows into the MCCFG according to the UML SD metamodel stored in the UML SD metamodel storing unit 100 and the MCCFG metamodel stored in the MCCFG metamodel storing unit 110 (S202).

In this state, the coverage criteria unit 130 changes the MCCFG into a tree structure (S204), decides a selection command input from the user (S206), and generates a test case 1 of SC, a test case 2 of DC, a test case 3 of CDC, or a test case 4 of MC/DC using the MCCFG according to the decided selection command (S208).

With the apparatus and the method of generating a test case based on a UML SD, the test cases having strengths according to priorities of the test are generated.

Therefore, it is possible to perform various levels of tests using a single model without complicatedly performing a test by mixing several models with each other.

Further, an effort used to test the software may be decreased, and a complicated model is not used in the case of designing the test case, such that a cost required for testing the software may be decreased.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

Accordingly, the scope of the present invention is not construed as being limited to the described embodiments but is defined by the appended claims as well as equivalents thereto.

What is claimed is:

1. A system for testing software, the system generating a multi-level test case from a unified modeling language (UML) sequence diagram (SD), the multi-level test case being based on a multiple condition control flow graph (MC-CFG), the system comprising:

at least one processor and a memory unit;

a unified modeling language (UML) sequence diagram (SD) metamodel storing unit which stores a unified modeling language (UML) sequence diagram (SD) metamodel therein;

a multiple condition control flow graph (MCCFG) metamodel storing unit which stores a multiple condition control flow graph (MCCFG) metamodel;

a model converting unit which converts the unified modeling language (UML) sequence diagram (SD) according to the unified modeling language (UML) sequence diagram (SD) metamodel and the multiple condition control flow graph (MCCFG) metamodel and generates the multiple condition control flow graph (MCCFG); and a coverage criteria unit which converts the multiple condition control flow graph (MCCFG) into a plurality of test cases.

2. The apparatus of claim 1, wherein the unified modeling language (UML) sequence diagram (SD) metamodel storing unit stores a unified modeling language (UML) sequence diagram (SD) metamodel extracted from a unified modeling language (UML) specification therein.

3. The apparatus of claim 1, wherein the unified modeling language (UML) sequence diagram (SD) metamodel includes at least one of Interaction, Lifeline, InteractionFragment, and Message.

4. The apparatus of claim 3, wherein the InteractionFragment includes CombinedFragment of which a kind includes seq, alt, opt, break, par, and loop.

5. The apparatus of claim 1, wherein the multiple condition control flow graph (MCCFG) metamodel includes at least one of ORDecisionNode representing an OR condition and AND-DecisionNode representing an AND condition in MultiConditionGroup.

6. The apparatus of claim 1, wherein the model converting unit maps the unified modeling language (UML) sequence diagram (SD) metamodel and the multiple condition control flow graph (MCCFG) metamodel to each other according to a mapping rule of an Atlas transformation language (ATL) to perform the model-conversion to the multiple condition control flow graph (MCCFG).

7. The apparatus of claim 1, wherein the coverage criteria unit changes the multiple condition control flow graph (MCCFG) into a tree structure and converts the tree structure into the plurality of test cases.

8. The apparatus of claim 1, wherein the plurality of test cases are at least one of statement coverage (SC), decision coverage (DC), condition/decision coverage (CDC), and modified condition/decision coverage (MC/DC) test cases.

9. The apparatus of claim 1, wherein the coverage criteria unit generates each of the plurality of test cases so as to be divided into at least one of Test scenario ID, Testcase ID, Inflow, Event, Condition, and Outflow.

10. A method of generating a multi-level test case in an apparatus of generating a multi-level test case from a unified modeling language (UML) sequence diagram (SD) based on a multiple condition control flow graph (MCCFG), the method comprising the steps of:

model-converting, by a model converting unit, the unified modeling language (UML) sequence diagram (SD) according to a unified modeling language (UML) sequence diagram (SD) metamodel and a multiple condition control flow graph (MCCFG) metamodel to generate the multiple condition control flow graph (MCCFG); and converting, by a coverage criteria unit, the multiple condition control flow graph (MCCFG) into a plurality of test cases.

11. The method of claim 10, wherein the unified modeling language (UML) sequence diagram (SD) metamodel is a unified modeling language (UML) sequence diagram (SD) metamodel extracted from a unified modeling language (UML) specification.

12. The method of claim 10, wherein the unified modeling language (UML) sequence diagram (SD) metamodel includes at least one of Interaction, Lifeline, InteractionFragment, and Message.

13. The method of claim 12, wherein the InteractionFragment includes CombinedFragment of which a kind includes seg, alt, opt, break, par, and loop.

14. The method of claim 10, wherein the multiple condition control flow graph (MCCFG) metamodel includes at least one of ORDecisionNode representing an OR condition and AND-DecisionNode representing an AND condition in MultiConditionGroup.

15. The method of claim 10, wherein in the model-converting, the unified modeling language (UML) sequence diagram (SD) metamodel and the multiple condition control flow graph (MCCFG) metamodel are mapped to each other according to a mapping rule of an Atlas transformation language (ATL) to perform the model-conversion to the multiple condition control flow graph (MCCFG).

16. The method of claim 10, wherein in the converting, the multiple condition control flow graph (MCCFG) is changed into a tree structure and the tree structure is converted into the plurality of test cases according to a selection command by a user.

17. The method of claim 10, wherein the plurality of test cases are at least one of statement coverage (SC), decision coverage (DC), condition/decision coverage (CDC), and modified condition/decision coverage (MC/DC) test cases.

18. The method of claim 10, wherein in the converting, each of the plurality of test cases is generated so as to be divided into at least one of Test scenario ID, Testcase ID, Inflow, Event, Condition, and Outflow.

19. The method of claim 10, wherein in the converting, each of the plurality of test cases is generated so as to be divided into at least five of Test scenario ID, Testcase ID, Inflow, Event, Condition, and Outflow.

20. The method of claim 10, wherein the plurality of test cases are of at least two of a statement coverage (SC), a decision coverage (DC), a condition/decision coverage (CDC), and a modified condition/decision coverage (MC/DC) test cases, and at least two of the statement coverage (SC), the decision coverage (DC), the condition/decision coverage (CDC), and the modified condition/decision coverage (MC/DC) test cases are generated from the same multiple condition control flow graph (MCCFG).

* * * * *